Figures 1, 2:
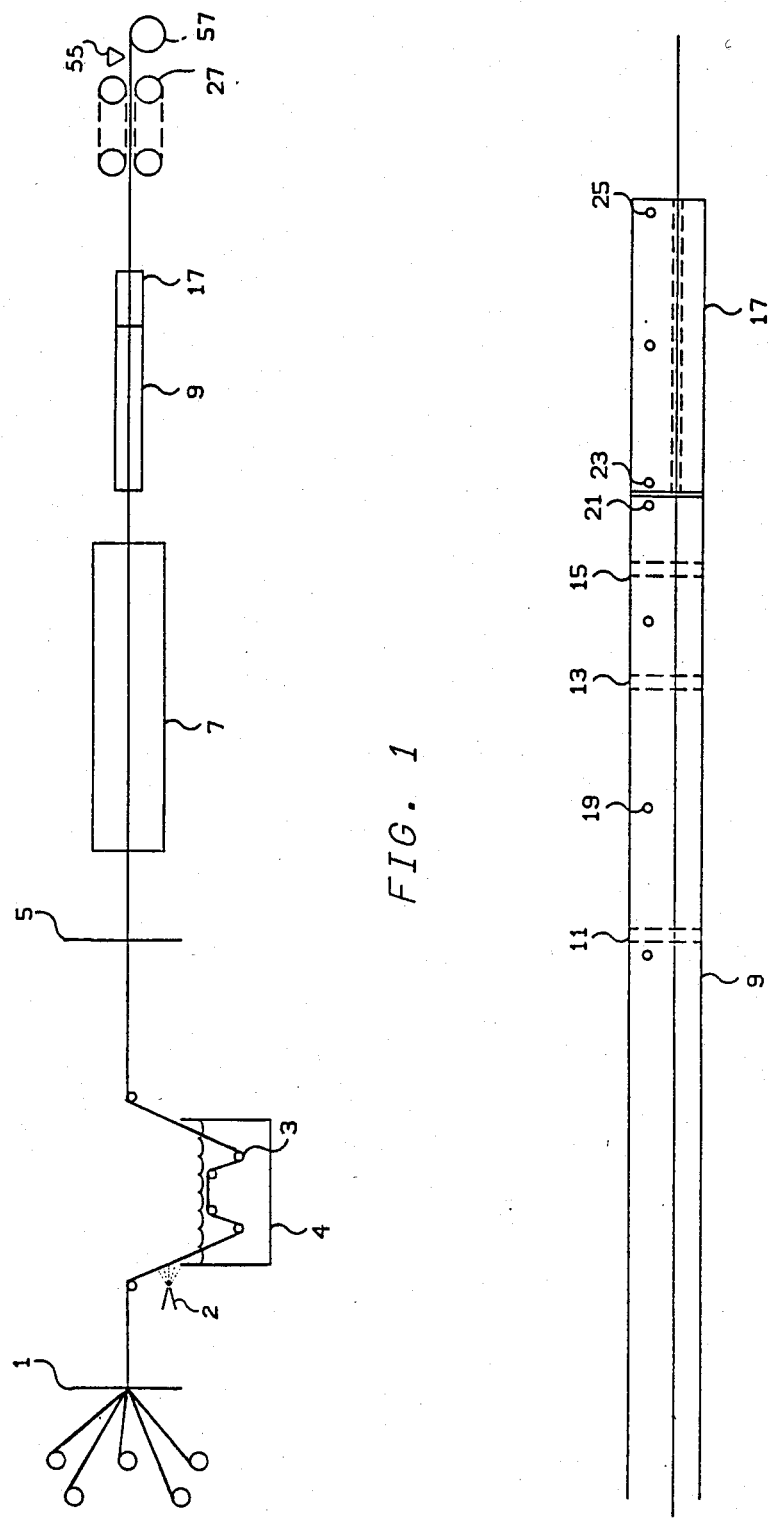

United States Patent [19]

O'Connor

[11] Patent Number: 4,680,224
[45] Date of Patent: Jul. 14, 1987

[54] REINFORCED PLASTIC

[75] Inventor: James E. O'Connor, Bartlesville, Okla.

[73] Assignee: Phillips Petroleum Company, Bartlesville, Okla.

[21] Appl. No.: 773,965

[22] Filed: Sep. 9, 1985

Related U.S. Application Data

[63] Continuation of Ser. No. 584,418, Mar. 6, 1984, which is a continuation-in-part of Ser. No. 483,013, Apr. 7, 1983.

[51] Int. Cl.$^4$ ............................................. D02G 3/00
[52] U.S. Cl. ................................. 428/294; 429/430.1; 428/304; 428/340; 428/402
[58] Field of Search ............... 428/284, 285, 286, 292, 428/294, 408, 902, 290

[56] References Cited

U.S. PATENT DOCUMENTS

| 3,971,748 | 7/1976 | Wang et al. | 260/37 R |
|---|---|---|---|
| 4,118,541 | 10/1978 | Power et al. | 428/452 |
| 4,292,105 | 9/1981 | Taylor | 156/242 |
| 4,292,106 | 9/1981 | Herschdorfer et al. | 156/243 |
| 4,376,710 | 3/1983 | Gardos et al. | 252/124 |
| 4,388,422 | 6/1983 | Gerteisen et al. | 523/137 |
| 4,389,453 | 6/1983 | Kitanaka et al. | 428/402 |
| 4,396,679 | 8/1983 | Gakv et al. | 428/412 |
| 4,399,058 | 8/1983 | Belbin et al. | 264/41 |
| 4,399,085 | 8/1983 | Belbin et al. | 264/41 |
| 4,464,429 | 8/1984 | Soret | 428/902 |
| 4,479,998 | 10/1984 | Belbin et al. | 428/220 |
| 4,479,999 | 10/1984 | Buckley et al. | 428/245 |
| 4,489,129 | 12/1984 | Shue et al. | 428/366 |
| 4,500,595 | 2/1985 | Gerteisen et al. | 428/294 |
| 4,549,920 | 10/1985 | Cogswell et al. | 156/181 |
| 4,559,262 | 12/1985 | Cogswell et al. | 428/294 |

OTHER PUBLICATIONS

CA 94:176603d, "Coated Glass Fabric"—pub. 3026987, W. Ger., 12 Feb. 81, Richard Graham Adams & Santo J. Milletari.
CA 95:170458j, "Carbon Fibers . . . Poly(phenylene sulfide), Toray, Jpn. Kokai Tokkyo Koho 81 90837, 23 Jul. 81.
CA 94:209916p, "Reinforced Thermoplastic Articles", Stafford, Dudley K., Lang, Lawrence A., Bz7900492, 20 Nov. 79.

Primary Examiner—James J. Bell
Attorney, Agent, or Firm—John R. Casperson

[57] ABSTRACT

A process for preparing shaped objects of continuous fiber strand material in a poly(arylene sulfide) matrix and the shaped objects prepared thereby. The shaped objects are prepared by a pultrusion process requiring adaptation of polymer slurry contacting with fiber strands and specifically adapted die apparatus suitable for use with viscous poly(arylene sulfide).

14 Claims, 8 Drawing Figures

SIDE VIEW

TOP VIEW

REINFORCED PLASTIC

This application is a continuation of application Ser. No. 584,418 filed Mar. 6, 1984, which in turn is a continuation-in-part application of copending application Ser. No. 483,013, filed Apr. 7, 1983.

BACKGROUND OF THE INVENTION

This invention relates to poly(arylene sulfide). In one of its aspects this invention relates to preparing shaped objects of poly(arylene sulfide). In still another aspect of this invention it relates to shaped object prepared from poly(arylene sulfide). In still another aspect of the invention it relates to the pultrusion of fiber strands impregnated with poly(arylene sulfide). In still another aspect of the invention it relates to processing steps useful in the pultrusion of fiber strands impregnated with poly(arylene sulfide). In yet another aspect of the invention it relates to molded objects produced using the processes described.

The production of molded products of polyester resin matrix reinforced with glass fiber by the pultrusion process is well established. In this process, a glass fiber roving is pulled from a creel, passed through a polyester resin bath for impregnation of the roving with the resin and with precise control for uniformity the excess resin is squeezed off the roving while passing through a preformer with a final shaping and curing in a heated die. The pulling mechanism located in the process after the curing die causes the roving to be forwarded through the processing system and then to further processing such as being cut to a desired length. Although the vast majority of pultruded products are formed from polyester resins reinforced with glass fibers, other fibers such as carbon, aramid and hydrid fibers which involve more than one type of fiber have also been used as reinforcement and such resins as vinyl ester and epoxy have seen use as the matrix material. Until recently, the use of thermoplastic resins in the pultrusion process has been almost non-existent. In the present invention, is set forth a method for producing pultruded products using poly(arylene sulfide) as the matrix material.

As will be noted below, pultrusion of poly(arylene sulfide) requires novel adjustment of processing techniques—including fiber content of pultrusion prepreg, size of polymer particle for impregnation, pulling tension, and die configuration—as compared to the known processes using thermosetting epoxy and polyester resins normally used in pultrusion processes.

Using poly(arylene sulfide) as the matrix provides pultruded products that have advantages over the same products made from other materials such as steel, wood, or aluminum. The pultruded products are lightweight, can be designed for the strength and stiffness required, are non-rusting, are corrosion resistant to numerous chemicals and gases, are non-conductive, and have low thermal conductivity. The products have potential use both as parts that become a portion of a larger fabricated structure when the pultrusion is incorporated into the overall fabrication (frames, supports, gratings) and in the type of products which are themselves structures (ladders, walkways, guardrails).

It is therefore an object of this invention to provide a method for preparing shaped objects of reinforced plastic in which poly(arylene sulfide) is the matrix for strands of reinforcing material. It is another object of this invention to provide a method for pultruding fiber strands impregnated with poly(arylene sulfide). It is still another object of this invention to provide shaped objects having poly(arylene sulfide) matrix and fiber strand reinforcement. It is still another object of this invention to provide pultruded objects in which fiber strand reinforcement is surrounded with a poly(arylene sulfide) matrix.

Other aspects, objects and the various advantages of this invention will become apparent upon the study of the specification of this application along with the drawing and the appended claims.

STATEMENT OF THE INVENTION

In accordance with the present invention, a process is provided for preparing shaped objects in which at least one fiber strand of continuous filaments is contacted with poly(arylene sulfide) having a melt flow greater than 100 grams/10 minutes in the form of powder or in a slurry maintained with sufficient poly(arylene sulfide) to produce a strand impregnated with poly(arylene sulfide) having about 20 to about 50 weight percent poly(arylene sulfide) content and about 80 to about 50 weight percent fiber content so that at least one impregnated strand is produced. The impregnated strand is then pulled through an elongated die having the characteristics of (1) entrance cross-section being larger than the exit cross-section, (2) the temperature of the entrance region being above the melting point of poly(arylene sulfide), and (3) the temperature in the exit region being sufficient to maintain at least a portion of the poly(arylene sulfide) in the molten state so that a formed composite having at least one impregnated strand is produced. This formed composite—which can have the form of a tape, a rod or a sheet, among others—is then cooled below the melting temperature of poly(arylene sulfide) and can be cut transversely into pieces or, in another embodiment of the invention, the formed composite is wound directly onto a mandrel, preferably heated, before cooling or, in still another embodiment of the invention, the formed composite wound onto a mandrel is further treated at a temperature and for a time sufficient to conform the formed composite to the shape of the mandrel upon cooling after which the formed composite is cooled below the melting temperature of poly(arylene sulfide).

In another embodiment of the invention in which impregnation is contacted with a slurry of poly(arylene sulfide) in a liquid diluent, the impregnated strand upon leaving the zone for contacting with poly(arylene sulfide) slurry is subjected to treatment for removal of slurry diluent liquid before entering the die. Since the slurry diluent will normally be water, the treatment will normally be a heating of impregnated strand material to evaporate water.

In still another embodiment of the invention, the fiber strand material is subjected to contact with a stream of gaseous fluid before being contacted with the poly(arylene sulfide) slurry to separate the strand into single filaments and/or bundles of filaments so that the contact between the filaments and the poly(arylene sulfide) slurry is improved. All of the process embodiments of this invention seek to provide a shaped object in which continuous fiber strand material is impregnated with poly(arylene sulfide) and surrounded by a poly(arylene sulfide) matrix. The process for producing such product by a pultrusion process is further detailed herein below.

The poly(arylene sulfide) resins, often abbreviated PAS, contemplated in the compositions useful in this invention include those described in U.S. Pat. No. 3,354,129 issued to Edmonds and Hill on Nov. 21, 1967, and those described in U.S. Pat. No. 3,919,177, issued to Campbell on Nov. 11, 1977. The presently preferred polymer is poly(phenylene sulfide), often abbreviated PPS.

The term poly(arylene sulfide) includes homopolymers and the normally solid arylene sulfide compolymers, terpolymers, and the like having melting or softening points of at least 300° F. (149° C.) and more preferably from about 400° to about 900° F. (204°–482° C.). Other examples of poly(arylene sulfide) are poly(4,4-biphenylene sulfide), poly(2,4-tolylene sulfide), a copolymer from p-dichlorobenzene, 2,4-dichlorotoluene and sodium sulfide, and the like.

For the process of the invention, the PAS is impregnated into the fiber strands by contact of the strands with a powder, or, preferably, a slurry of PAS in a liquid carrier which is preferably water. The preferred PAS for this invention, unless using the constant-taper die described in FIG. 5, will have a flow rate of at least 100 grams/10 minutes, determined according to ASTM D1238 modified to a temperature of 316° F. and a total weight of 5.0 Kg, preferably will have a flow rate of at least 200 grams/10 minutes, and most preferably will have a flow rate of at least 500 grams/10 minutes. No limit has been found as to an upper flow rate range for the PAS, for a flow rate of about 6,000 to 20,000 grams/10 minutes is known to be readily operable. When the constant-taper die is used, PAS having a flow rate in the range of about 1 to about 20,000 grams/10 minutes can be used, with a preferred range of about 40 to about 1,000 grams/10 minutes.

Since the PAS of melt index as discussed above provides a viscous slurry which can readily overload a fiber strand and cause problems with the operation of a pultrusion system, it has been found necessary to dilute the PAS slurry with sufficient liquid to obtain an efficiently workable loading of the fiber strands to produce an impregnated strand having about 20 to about 50 weight percent PAS content and about 80 to about 50 weight percent fiber content. When using particular fibers such as glass or carbon, it has been found preferable that for glass fiber the PAS content be in the range of about 20 to about 40 weight percent and for carbon that the PAS content be in the range of about 25 to about 45 weight percent of the total composition. These are practical limitations set as the amount of polymer needed to impregnate and provide a matrix within which the strand is contained and yet not to provide so much polymer that passage of the impregnated strands through the apparatus is impeded sufficiently that breakage of the strands is caused.

It has been found that a particle size of about 10 to about 15 microns for the PAS used for impregnating the fiber strands provides excellent penetration of the strand particularly using the, now preferred, die as set out in Example X and a polymer loading in the range of about 30 to about 45 weight percent of the total composition as set out in Example XI using carbon fiber.

Inclusion of excessive diluent in the slurry can result in too little polymer on the fiber or can cause diluent to be carried into the die which can readily be seen to be undesirable. The impregnated strand can be tested for proper content of polymer by sampling the impregnated strand at the drying step with the determination of the weight of polymer, the weight of fiber and the water content, usually nil, or the particular sample. The amount of dilution of the slurry can then be adjusted according to the results of the particular dried sample.

The materials used in fiber strands according to this invention can be any material found suitable to withstand the rigors of the pultrusion process and to provide reinforcement of the PAS. Fibers of glass, carbon, aramid, and hybrids involving more than one type of fiber can be used. Presently, strands of glass or carbon fiber are preferred since these are the most easily obtained commercially.

In the now preferred process of this invention it has become apparent that the configuration of the die is important and that a die having a continuous taper from entrance to exit produces fewer problems for continuous pultrusion operation than other die configurations that have been tried that have curved surfaces or multiple straight surfaces of varying tapers. At present the die of Example X having sides that are straight, but continuously tapered, is cited as optimal.

Similarly, continued testing of operating techniques and equipment has shown, as illustrated in Example XIII below, that pulling the fibers to provide as high tension, as practicable without breaking the fibers being pultruded causes a more uniform spread and overlapping of the fibers within the width of the pultrudate and diminishes the tendency of pultruded tape product to split transversely.

Figure 3:
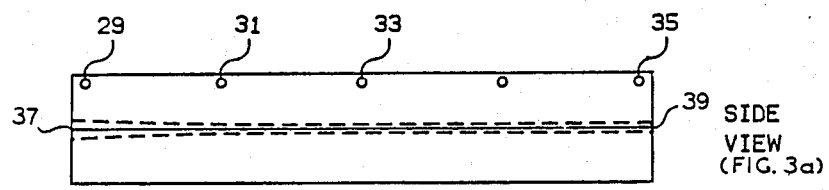
Figure 3:
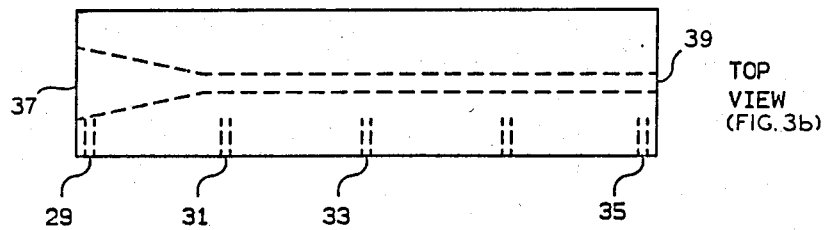
Figure 4:
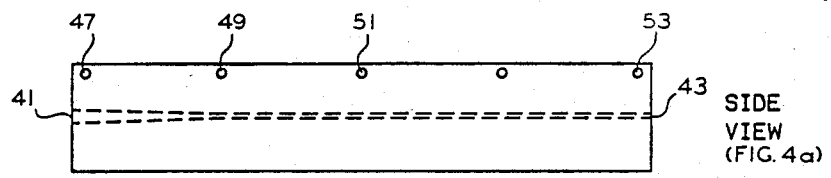
Figure 4:
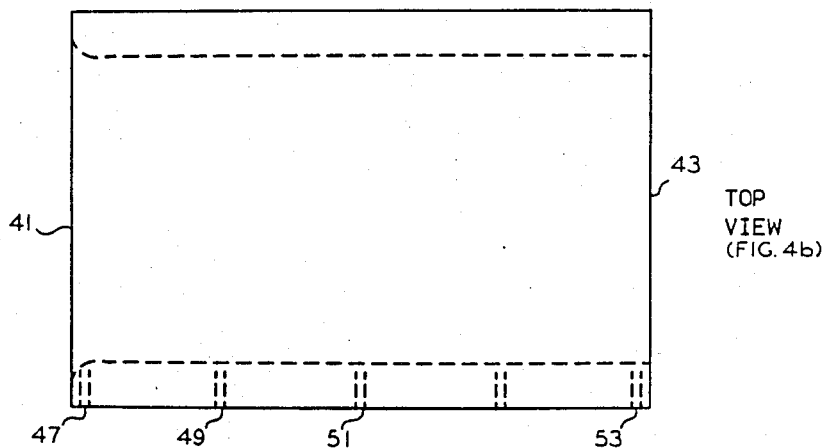
Figure 5A:
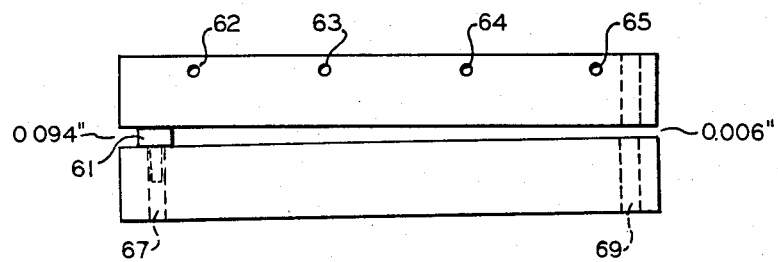
Figure 5B:
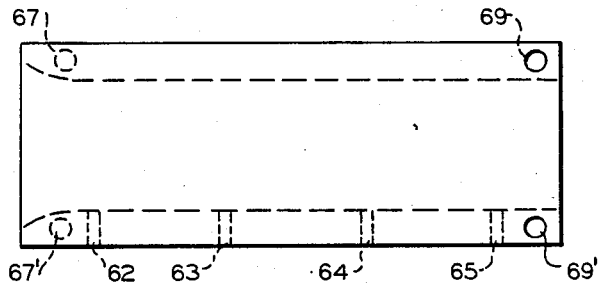

The process of the invention can be most easily understood by description in conjunction with the drawing. In the drawing FIG. 1 is a line representation of the process, FIG. 2 shows the die and its preheater in detail, FIG. 3a is the side view of a die having a funnel-shaped entry, FIG. 3b is the top view of a die having a funnel-shaped entry, FIG. 4a is the side view of a die accommodating a multiplicity of strands, FIG. 4b is a top view of a die accommodating a multiplicity of strands, FIG. 5a is the side view of a continuously tapered die, and FIG. 5b is the top view of a continuously tapered die.

Referring now to FIG. 1, a single strand or a multiplicity of strands are passed through roving guide (1) and optionally past spray nozzle (2) through which a flow of gaseous fluid is emitted into contact with the strand material with sufficient velocity to spread an individual strand so that single filaments or bundles of single filaments are separated providing space therebetween so that subsequent contact with polymer slurry can be more effective. For the purpose of this invention, air is adequate as the gaseous fluid. Each strand is passed around several redirect bars (3) which cause the spreading of the fiber strand in the bath (4) containing aqueous PAS slurry so that the individual filaments have better contact with the polymer slurry. Alternatively the contact is with dry powder.

Impregnated fiber strands are then pulled through a guide mechanism (5) for alignment for passage through a heated drying chamber (7) which removes the slurry diluent leaving a dry strand impregnated with polymer which is then pulled through preheating chamber (9) and heated die (17).

Referring now to FIG. 2 for a more detailed description of the preheater (9) and die (17), each strand passes through guide (11) and two preshaping devices (13) and (15) so that the strand is aligned and preshaped on passing into the heated metal die (17). Both the preheater and the die are equipped with thermocouples (19), (21), (23), and (25) for monitoring the temperature of the preheater and the die.

Referring now to FIGS. 3a and 3b, a preferred die device for producing a tape or rod is shown. The die has a single cavity with a V-shaped mouth (37) which decreases in cross-sectional area to a constant cross-section (39)—which can be rectangular, ovate or circular—for the remainder of the length of the die. This die is equipped with thermocouples such as (29), (31), (33), and (35) for measuring the temperature throughout the length of the die. The V or funnel-shape of the mouth of the die allows for easier entrance and gradual compacting of the strand as it passes into the heated die. The polymer has been heated above the melting point of PAS in the preheater, preferably to about 300°–350° C. for PPS, and the temperature is allowed to drop through the length of the die to a temperature that is sufficient to maintain at least a portion of the PAS in molten state as it exits the die, preferably to about 230°–280° C. for PPS. Controlled means for providing heat to the preheater and die is provided by electrical strip heaters which are not shown.

Referring to FIGS. 4a and 4b a similar die for producing a thin sheet is shown. In this die, the mouth (41) is again of greater area of cross-section than the outlet (43). The cross-sectional area decreases to become a wide flat rectangle (45) and remains at this constant dimension through the rest of the die. This die is also equipped with thermocouples (47), (49), (51), and (53). The larger cross-sectional area of the mouth of the die provides for easier entrance and gradual compacting of the polymer, as previously discussed.

Referring to FIGS. 5a and 5b a die having continuous straight walls and a constant taper has been provided by placing shims (61) in the entrance edge of the die at bore holes (67), (67') to prop the opening at a dimension of 0.094 inch, the thickness of the shim. The die was bolted through bore holes (69), (69') to allow easy access to the die cavity for clean out. Thermocouples can be inserted through (62), (63), (64), (65) to allow temperature measurement to determine gradient over the length of the die which can be equipped with electrical stripheaters which are not shown.

Referring again to FIG. 1, the strand or strands, now a formed composite of fiber strand impregnated and surrounded by a PAS matrix, are pulled out of the die (17) by a gripping/pulling mechanism (27) of the type which is commonly used in pultrusion processes. After passing through the pulling mechanism the formed composite then can be cut to any desired length using cutting device (55). These cut lengths, particularly of sheet material, are known as prepregs and can be stacked and compression molded together to form multi-layer laminates of great structural strength.

Alternatively, a rotating mandrel (57), preferably heated, can be used as the pulling device upon which the heated, formed composite is wound. Such mandrels are known in the art as shown in U.S. Pat. Nos. 4,010,054 and 4,081,302. The wound composites can then be shipped with reheating and unwinding at the shipping destination or heated sufficiently for permanent bonding to form hollow shaped objects.

The following examples illustrate the process of the invention and the Examples III, IV and IX, direct reference is made to numbers in the drawing so that the examples can be more readily understood.

EXAMPLE I

In this example the feasibility of pultruding glass fiber strands (rovings) impregnated with poly(phenylene sulfide) (PPS) powder is demonstrated. Fine Ryton® FS-5 PPS powder (flow rate of 750–950 grams/10 minutes, determined according to ASTM D1238, modified to a temperature of 316° C. and a total weight of 5.0 Kg; marketed by Phillips Chemical Company, Bartlesville, Okla.) was sprinkled on glass fiber strands (Owens Corning type 30, 432 BC-113; each strand having a desity of 2.55 g/cc, and containing 4000 filaments of 0.92 mm diameter) and worked in with a spatula while spreading the rovings apart.

Three powder-impregnated glass rovings were slowly pulled by hand through a 3"×2"×1¼" aluminum block having a ⅛" bore along glass rovings could be pulled through with no major problem. When the powder-impregnated rovings reached the hot die, the powder melted and wetted the fibers. At the die exit the PPS solidified, and the polymer impregnated glass fiber rovings became rigid rods containing about 65 to about 70 weight percent glass and about 30 to about 35 weight percent PPS.

EXAMPLE II

This example demonstrates the feasibility of impregnating glass fiber strands with an aqueous PPS slurry and pultruding these strands. 200 grams of FS-5 PPS, 260 grams of water and 5 grams of Emulphor EL 620 wetting agent (a polyoxyethylated vegetable oil marketed by G.A.F. Corporation, New York, N.Y.) were ball milled for about 18 hours. Three glass strands (Owens Corning 432 BC-113) were passed through the agitated slurry, air dried and then pulled by hand through a die of ⅛" diameter (see Example I) that was heated to about 600° F. Solidified rods had a PPS content of 36 to about 40 weight percent and a glass fiber content of 60 to about 64 weight percent.

In another test a poly(tetrafluoroethylene) lubricating agent, Fluon L 196 (ICI America; Wilmington, Del.), was also used in the PPS slurry: 100 grams of PPS, 150 grams of water, 2.5 grams of Emulphor EL 620 and 5 grams of Fluon L 196 PTFE were ball milled for 18 hours. Four glass rovings were impregnated, dried and pulled through a heated round die of 5/32" inner diameter, essentially in accordance with the procedure of Example I.

EXAMPLE III

This example illustrates pultrusion experiments employing a laboratory size pultrusion machine (Model P.500; Pultrex USA, 407 Country Club Dr., San Gabriel, CA 91775) and using the set up illustrated in FIGS. 1 and 2. Eight or more fiber strands were passed through a roving guide (1) and a bath (4) that contained an aqueous PPS slurry and was equipped with several redirect bars (3) designed to spread the fiber strands for optimal PPS resin pickup. The aqueous PPS slurry was prepared by ball milling (for about 20 hours) 1500 ml of water, 1000 grams of PPS (FS-5) powder, and 25 grams of Emulphor EL 620 wetting agent (see Example II). The wet, impregnated glass strands were pulled through a guide mechanism (5), a heated drying chamber (7) (length: 123 cm), a preheating chamber (9) (length: 30.5 cm) designed for melting PPS resin and equipped with a fiber guide (11) and two preshaping devices (13), and (15), and finally through a heated metal die (17).

The die was a single cavity, split die of 10.1 cm length and having a constant cross-section of 12.7 mm×2.54 mm. The preheating chamber and the die were heated with two electrical strip heaters (not shown) placed above and below the chamber and die. Thermocouples (19), (21), (23), and (25) were used to monitor the temperature in the preheating chamber and in the die. Temperatures during pultruding were typically at (19): about 340°-350° C., at (21): about 300°-345° C., at (23): about 280°-330° C., at (25): about 235°-290° C. The pultruded fiber-resin product was pulled by a gripping-/pulling mechanism (27) at a rate of about 15 cm/minute.

A major operational problem was encountered in that excess PPS resin picked up by the fibers accumulated at the preshaping devices, especially at the die entrance. This excess resin did not flow off (as thermosetting epoxy or polyester resins employed in pultrusion would generally do) because of the high viscosity of the thermoplastic, high molecular weight PPS resin. This buildup of PPS resin, especially at the die entrance, disrupted the smooth flow of impregnated fibers into the die and caused the breaking of fibers, which eventually resulted in severe jamming at the die entrance and a complete interruption of the pultrusion process. This problem was alleviated at adjusting the PPS resin content in the aqueous slurry in bath (1), e.g., by dilution with water, to provide a controlled, optimal fiber: PPS ratio, with essentially no excess resin being stripped off at the die entrance. Thus the fiber-resin ratio in the process of pultruding fiber strands impregnated with thermoplastic PPS resin was controlled in the resin bath and not at the die entrance as in the case of pultruding strands impregnated with thermosetting resins.

However, even after the PPS content in the aqueous resin slurry and the fiber-resin ratio were optimized, jamming of the PPS-impregnated fiber strands at the die entrance and subsequent breakage frequently occurred. Approximately 37 meters was the maximum length of any pultruded product formed in the process of this example employing a die of constant cross-section. This jamming problem was finally overcome by employing a "second generation" die described in Example IV.

Of ten pultrusion attempts only three were partially successful. Samples of these three glass-PPS composites prepared in accordance with the pultrusion process described in this Example had an average glass content of about 60 to about 70 weight percent and an average PPS content of about 30 to about 40 weight percent.

The average tensile strength (ATSM D3039-76) of 22.86 cm×1.27 cm×0.25 cm pultruded test specimens was 260 MPa (range: 214-335 MPa). The average flexural strength (ASTM D790-71) of 12.7 cm×1.27 cm×0.25 cm pultruded test specimens was 115 MPa (range: 90-142 MPa); and the average flexural modulus (ASTM D790-71) of these specimens was 14.8 GPa (range: 8.7-22.1 GPa). (Note: MPa is equal to $10^6$ pascals; GPa is equal to $10^9$ pascals).

EXAMPLE IV

In this example a "second generation" funnel-shaped die (FIG. 3) was employed. This die was a single-cavity, split die of 20.3 cm length. Its cavity decreased from an entrance cross-section of 25.4 mm×5.1 mm to a final constant cross-section of 12.7 mm×2.5 mm within the first 5.1 cm of the die length. A preheating chamber (length: 30.5 cm) containing a fiber guide, electrical strip heaters to heat the chamber and the funnel-shaped die, thermocouples to monitor the temperature in various locations, and gripping/pulling devices were employed as in Example III. Preshaping devices (13) and (15) (FIG. 1) in the preheating chamber were deleted.

Pultrusion of glass fiber strands (Owens Corning type 30,432 BC-113) impregnated with the aqueous PPS (FS-5) slurry described in Example III, (sometimes diluted with water for adjusting the PPS resin pickup), employing the funnel-shaped die described above resulted in considerably fewer operating problems than the operation outlined in Example III. Generally no jamming and/or breaking of fibers occurred at a pultrusion rate of about 15 cm/minute. This significant improvement in the pultrusion operation was primarily attributable to the funnel-shape of the die.

The optimal temperature profile in the funnel-shaped die (FIG. 3) was: at (29): about 330°-350° C.; at (31): about 320°-330° C.; at (33): about 300°-320° C.; at (35): about 230°-250° C. The temperature profile in the preheating chamber was essentially the same as in Example III. Usually 8-10 glass fiber strands were pultruded, at a pulling speed of about 15 cm/minute, through the funnel-shaped die.

Ten of a total of fifteen pultrusions runs were successful, and 54 samples from nine ruNs were tested for mechanical properties. Tensile and flexural properties of these samples using the procedures described in Example III were: tensile strength ranged from 220 MPa to 413 MPa; flexural strength ranged from 50 MPa to 208 MPa; flexural modulus ranged from 7.3 GPa to 24.1 GPa. The pultruded PPS/glass composites had an average glass fiber content of about 70 weight percent (range 64-76 weight percent) and an average PPS content of 30 weight percent (range: 24-36 weight percent). Four of the five runs that were not successful, because of jamming and breaking of fibers, employed die exit temperatures at (35) that were too low: below 220° C.

The optimal die exit temperature employed (235°-245° C.) was high enough to keep the PPS resin of the pultruded object at least partially in the molten state. This allowed the exterior of the pultruded object to expand slightly as it exited the die, before the PPS completely solidified. In addition, as the interior of the sample cooled, it shrank slightly. These effects caused the pultruded, solidified objects to contain a rather large void space estimated to be about 10-15 percent by volume.

EXAMPLE V

In this example the pultrusion of carbon fiber strands (Thornel 300, WYP 3 1/0; marketed by the Carbon Products Division of Union Carbide Corporation, New York, N.Y.) impregnated with PPS is described. Essentially no changes in the experimental setup illustrated in Example IV were made. The die temperature profile was essentially the same as for the pultrusion of glass fibers (see Example IV). Generally 12-16 fiber strands were pultruded at a pultrusion speed of 12.7-25.4 cm/minute.

The composition of the aqueous PPS slurry used for impregnating carbon fibers was essentially the same as the one described in Example III, except that the slurry was adjusted for the desired PPS to fiber ratio. Pultruded carbon fiber-PPS composites contained on the average about 37 weight percent of PPS (FS-5; range 30-45 weight percent) and about 63 weight percent carbon fibers. Again, since the pultruded objects exited the die before the PPS resin was completely solidified, a relatively high void space resulted. Generally about 47-53 volume percent of pultruded composites consisted of carbon fibers, about 32-40 volume percent was occupied by PPS, and about 10-15 volume percent was void space.

Twelve of a total of sixteen pultrusion runs employing carbon fibers were sucessful. Four initial runs were unsuccessful because of excessive PPS resin pickup (before the dilution of the standard aqueous PPS slurry was optimized) that resulted in jamming and fiber breakage. Eighty-six samples of the twelve successful pultrusion runs were tested using test procedures described in Example III. Tensile strength ranged from 477 MPa to 813 MPa; flexural strength ranged from 342 MPa to 861 MPa; flexural modulus ranged from 26 GPa to 85 GPa.

EXAMPLE VI

In this example the preparation of thin, wide carbon fiber reinforced PPS "prepreg" sheets by pultrusion through a wide, flat funnel-shaped die (FIG. 4) is described. The die waas 20.3 cm long. Its entrance cross-section was 2.5 mm×102 mm, which decreased to about 0.6 mm×102 mm within the first 5.1 cm of the die length.

The temperature in the entrance region of the die ranged from about 310° C. to about 340° C.; and the temperature in the exit region ranged from about 250° C. to about 280° C. Generally 24-27 carbon fiber strands (Thronell 300, WYP 3 1/0) were impregnated by pulling them through an aqueous PPS (FS-5) slurry prepared in accordance with the procedure described in Example III and diluted with the appropriate amount of water to give the desired PPS to fiber ratio at a specific pultrusion speed. Generally the pultrusion speed was about 15 cm/minute. The temperature in the drying chamber and preheating chamber was essentially the same as indicated in Example III. No fiber guide was employed in the preheater.

The average carbon fiber content of 38 samples of pultruded "prepreg" sheets was about 63 weight percent (range: 57-67 weight percent), and the average PPS content was about 37 weight percent. These thin "prepreg" sheets were subsequently plied and compression molded to make laminates. Generally 4-6 layers of pultruded "prepreg" sheets were molded for about 10 minutes in a metal mold cavity of 22.9 cm×25.4 cm×2.54 cm, at a temperature of about 500° F. (initial) to about 580°-600° F. (final), under an average pressure of about 500 psi.

Unidirectional laminates were formed by plying pultruded "prepregs" such that the fiber direction was the same in all plies. In cross-plied laminates the fiber direction alternated in successive layers (e.g., sequence of the fiber direction was 0°, 90°, 0° etc). The void content of molded "prepreg" laminates was about 2-4 volume percent and thus was considerably lower than for pultruded carbon fibers-PPS composites described in Example V.

Mechanical properties of 5 unidirectional, compression-molded PPS-carbon fiber laminates (6 plies), measured in the fiber direction according to the procedures described in Example III, were: flexural strength ranged from about 1061 MPa to about 1459 MPa; flexural modulus range from about 97 GPa to about 117 GPA. Corresponding physical properties of a molded cross-plied laminate (6 layers, 0°, 90°, 0°) were: flexural strength ranged from about 341 to 438 MPa; flexural modulus ranged from about 60 to 72 GPa.

EXAMPLE VII

In this example the effect of the PPS melt flow on the smoothness of the pultrusion of PPS impregnated carbon fibers is described. Key processes are summarized in Table I. The die described in Example IV was used for test runs.

Data in Table I show that PPS resin having a flow rate ranging from about 140 to >6000 can be employed in the pultrusion process of this invention. However, the preferred flow rate range of PPS resin for pultruding impregnated carbon fiber strands for at least ½ hour without breaking was about 525 to >6000.

TABLE I

| Run | | | | | | |
|---|---|---|---|---|---|---|
| Flow Rate of PPS[1] (grams/10 min.) | 140-220 | 175 | 525-625 | 750-950 | 800 | >6000 |
| Number of Carbon Fiber Strands | 26 | 24 | 27 | 27 | 27 | 24 |
| Wt % PPS in Slurry | 3.4-3.6 | 1.6-2.4 | 2.5-3.0 | 3.8-4.2 | 2.7-2.8 | 4.4-5.3 |
| Wt % Fiber in Pultruded Sheet | 62 | 60 | 58.7-62.5 | 61.8-64.8 | 65.8-67.2 | 57 |
| Pulling Force Setting | 4.8-5.0 | 5.0-5.5 | 1.6-2.0 | 1.8-2.0 | 2.0-2.4 | — |
| Pulling Rate (cm/min.) | 15 | 15 | 15 | 15 | 15 | 15 |
| Preheater Temp. (°C.) | 312-326 | 315 | 288-317 | 284-301 | 299-315 | 260-285 |
| Die Entrance Temp. (°C.) | 326-333 | 324 | 317-332 | 321-333 | 322-340 | 296-305 |
| Die Exit Temp. (°C.) | 273-275 | 274 | 276-278 | 273-280 | 277-281 | 252-256 |
| Run Time (min.) | <10[2] | <10[2] | 120[3] | 285[3] | 33[3] | 120[3] |
| Maximum Length of Pultruded Sheet (ft) | —[4] | —[4] | 50 | 133 | 16 | 47 |

[1]determined according to modified ASTM D1238 (See Example I).
[2]strands brake; test was interrupted.
[3]strands did not break; run was stopped because slurry or fiber material was used up.
[4]not measured.

EXAMPLE VIII

In this example the winding of a pultruded PPS-impregnated carbon fiber strand onto a mandrel for making PPS-carbon fiber composite tubes is described. One Celion 12000 carbon filament strand (Celanese Fibers Company, Charlotte, N.C.) was pulled through an aqueous PPS slurry bath containing 9.2 weight percent FS-5 PPS resin, a drying chamber, and a flat heated die (height: 0.011", width: 4.02", length: 7.99"). The die temperatures were 332°-344° C. in the front region and 277°-286° C. in the exit region. The carbon fiber strand was pulled by grippers at a speed of about 36" per minute. Since the single carbon fiber strand did not fill the die cavity the formed composite tape produced had a height of 0.011" but a width of only 0.156".

The continuous pultruded tape was wound by hand onto two spools which were at room temperature: the first portion onto a spool with a metal pipe core (mandrel) of 3.5" outer diameter, and the remainder onto a cardboard core. The tape was wound onto the mandrel in a circumferential (90° C.) pattern. The three-layer wrapping covered a length of about 7" on the mandrel. The end of the wound tape was clamped to the mandrel and the mandrel with pultruded tape layers was placed in an oven for partial melting of the PPS resin and consolidation of the layers. Results:

(a) after about 20 minutes at 250° C., the wound tapes were still loose and had not conformed to the mandrel shape after cooling;

(b) after about 20 minutes as 280° C., the wound tapes were still loose but conformed partially to the mandrel after cooling;

(c) after about 20 minutes at 295° C., the PPS resin had melted, the three pultruded layers had completely conformed to the shape of the mandrel after cooling, and the fused PPS-carbon fiber composite layers could be slipped off the cooled metal mandrel as one solid tube (length: 7", inner diameter: 3.5"; wall thickness 0.035").

EXAMPLE IX

In this example an optional feature of the fiber feeding and impregnation system is described. An air jet (4), located between the roving guide (1) and the resin slurry bath (2) (see FIG. 1), is used to expand the fiber strands prior to entry into the resin bath. This air jet comprises a nozzle or similar orifice, which supplies a stream of air that loosens and spreads apart the individual filaments of the fiber strands for more intimate contact with the PPS resin particles in the slurry of bath. A more thorough resin impregnation of the filaments will this be attained.

The application of the optional feature described in the example also has the advantage that fiber strands can be fed at a smaller angle of redirection prior to entry into the resin bath, therefore, at a reduced tension, because the action of the air jet rather than tension on the redirect bars (3) causes the fiber strands to spread apart. Feeding at a reduced tension is especially advantageous when fragile fibers, i.e., carbon fibers, are employed in the pultrusion process of this invention. Therefore, the use of the air jet will result in reduced fiber breaking.

EXAMPLE X

In this example a heated die was used that is suitable for pultruding fiber strands impregnated with PPS of low melt flow (less than 100 g/10 min.). The die was a single-cavity, split stainless steel die of 20.3 cm (8.0 inch) length and a constant 10.16 cm×0.15/cm (4.00 inch×0.006 inch) cross-section. In order to provide a constant taper along the length of the die and to reduce the contact area between resin-impregnated fiber strands and metal wall to alleviate fiber breaks, two stainless steel shims were placed in the die at the entrance to alter the constant cross-section. Each shim was 2.4 mm (0.0494 inches thick).

The two die halves were bolted together by two bolts inserted through bore holes in the solid metal portions of the die halves near the exit. The entrance portions of the die halves were not bolted together so that the die could be opened quickly and easily for clearing. A strip heater was attached to the bottom die half by clamps, and another strip heater was attached to the top half. The strip heaters were covered with fiberglass insulation material. Three thermocouples were inserted into thermocouple wells: one near the die entrance, one in the middle and one near the die exit.

EXAMPLE XI

In this example the pultrusion of carbon fiber strands impregnated with MR03 PPS resin (available from Phillips Chemical Company, Bartlesville, OK) having a flow rate of about 40 g/10 min is illustrated. 32-33 stands of Celion 6000 carbon fibers (supplied by Celanese Plastics and Specialties Co., Chatham, N.J.) were pulled through a resin slurry bath (containing about 500 grams of MR03 Ryton® PPS powder, about 4.5-5.0 liters of water, about 25 grams of Emulphor EL 620 and about 5 grams of $Li_2CO_3$ (as metal corrosion inhibitor), then through the drying chamber, and finally through the heated die described in Example X. The pulling force setting was about 1.8-2.1. Other pertinent process conditions are listed in Table II.

Data in Table II show that pultrusion of carbon fibers impregnated with PPS of low flow rate (about 40 g/10 min.) through the die of Example X for several hours was possible without severe processing problems and produced pultruded tapes of good quality. This result is in contrast to the markedly poor performance of pultrusion runs described in Example VII, using strands impregnated with PPS of higher flow rate (140-220 g/10 min) but employing one of the earlier described, partially tapered dies. Presently preferred operating ranges, using the heated die of Example X, are: die entrance temperature of about 340° to about 370° C., die exit temperature of about 280° to about 300° C., fiber content of about 55 to about 70 weight percent, and minimum pulling speed of about 30 cm/min.

TABLE II

| Run | Pulling Rate (cm/minute) | Wt % of PPS in slurry | Die Temp. (°C.) Entrance | Die Temp. (°C.) Exit | Wt % Fiber in Pultruded Tape | Run Time (Hours) | Observation Process | Observation Pultruded Tape |
|---|---|---|---|---|---|---|---|---|
| 7 | 28 | 8.4–8.5 | 351–362 | 287–362 | 65.5–66.3 | 2 | few die clean-outs | good appearance |
| 8 | 28 | 9.2–9.6 | 350–382 | 289–315 | 64.6–68.2 | 2.5 | few jams and clean-outs | good sample; 1 split |
| 9 | 28 | 9.6–9.7 | 376–386 | 304–312 | 63.9–66.2 | 2 | some jamming | sample looks good |
| 10 | 29 | 9.7–10.1 | 352–373 | 287–315 | 66.1–68.0 | 4 | some die clean-outs | very good appearance |
| 11 | 27 | 10.1 | 345–358 | 286–311 | 65.2–65.4 | 2.5 | many die clean-outs | poor quality many splits |
| 12 | 30.5 | 7.9–8.2 | 331–337 | 282–290 | 61.1–63.2 | 2.8 | very smooth | sample looks very good |

TABLE II-continued

| Run | Pulling Rate (cm/minute) | Wt % of PPS in slurry | Die Temp. (°C.) Entrance | Die Temp. (°C.) Exit | Wt % Fiber in Pultruded Tape | Run Time (Hours) | Observation Process | Observation Pultruded Tape |
|---|---|---|---|---|---|---|---|---|
| 13 | 30.5 | 7.9–8.2 | 334–351 | 283–297 | 58.6–62.8 | 3 | some polymer buildup | excellent sample; no splits |

EXAMPLE XII

This example illustrates the effect of the PPS particle size on the quality of pultruded tapes prepared essentially in accordance with the procedure described in Example XI.

It was observed that the penetration of ball-milled FS-2 PPS particles (flow rate: 120±20 g/10 min, average particle size: 9–20 microns) into carbon fiber strands during slurry impregnation was significantly better than the penetration of ball-milled MR03 PPS particles (flow rate: about 40 g/10 min.; average particle size: 35–68 microns). The poor to fair penetration by MR03 particles caused uneven polymer coating of pultruded tapes and also some polymer accumulation in the die thereby necessitating more frequent die clean-outs.

The above-described penetration problem was solved when MR03 PPS particles were ground in an air impact mill (Model T-15, Garlock, Inc., Newtown, PA.) to an average particle size of about 13 microns. A PPS particle size of about 10–15 microns is, therefore, considered optimal for the pultrusion process of this invention.

EXAMPLE XIII

This example illustrates the beneficial effect of the tension on the fiber strands during the pultrusion process of this invention. It was observed that pultruded carbon fiber tapes split less easily in the transverse direction (i.e., along the boundaries of the PPS-impregnated fiber strands) when the carbon fiber strands were pulled at higher tension causing them to spread out and overlap more extensively. For example, when carbon fiber strands were unwound from a spool that contained about 4 lbs of fiber strands (run 14), the tension on the strands was higher due to the greater weight (and torque) of the spool than in another run employing a spool with only about 1 lb of fiber strands (run 15). The pultruded prepreg tape produced in run 14 showed no splits, whereas the tape produced in run 15 was badly split.

That which is claimed is:

1. A reinforced plastic comprising
   (a) a roving of reinforcing material having unidirectionally aligned fibers in
   (b) a poly(arylene sulfide) matrix.
2. A reinforced plastic as in claim 1 wherein
   (a) the roving comprises continuous filaments of fiber aligned by pultrusion; and
   (b) the poly(arylene sulfide) has a melt flow in the range of 1–20,000 grams/10 minutes.
3. A reinforced plastic as in claim 2 comprising 20 to about 50 weight percent poly(arylene sulfide) and 80 to about 50 weight percent fiber.
4. A reinforced plastic as in claim 3 wherein the poly(arylene sulfide) has a melting point of at least 300° F.
5. A reinforced plastic as in claim 4 wherein the poly(acrylene sulfide) has a melting point in the range of 400° F. to about 900° F.
6. A reinforced plastic as in claim 5 wherein the fibers comprise glass, carbon, or aramid.
7. A reinforced plastic as in claim 6 wherein the poly(arylene) sulfide has a flow rate greater than 100 g/10 min.
8. A reinforced plastic as in claim 1 wherein the poly(arylene) sulfide has a flow rate in the range of about 40 to about 1000 g/10 min.
9. A reinforced plastic as in claim 6 wherein the roving comprises continuous filaments and the reinforced plastic comprises 25 to 45 weight percent of polyphenylene sulfide.
10. A reinforced plastic as in claim 6 wherein 52–67 volume percent consists of fibers and about 36–50 volume percent consists of poly(phenylene sulfide), not including any void volume which may be present.
11. A reinforced plastic as in claim 6 further characterized as a thin, wide, fiber reinforced, "prepreg" sheet.
12. A reinforced plastic as in claim 11 further characterized by a plurality of the prepreg sheets laminated together.
13. A reinforced plastic as in claim 3 in the form of a tape, rod or sheet.
14. A reinforced plastic as in claim 2 in the form of a tape, rod, or sheet.

* * * * *

REEXAMINATION CERTIFICATE (1674th)

United States Patent [19]

O'Connor

[11] B1 4,680,224
[45] Certificate Issued  Apr. 7, 1992

[54] REINFORCED PLASTIC

[75] Inventor: James E. O'Connor, Bartlesville, Okla.

[73] Assignee: Phillips Petroleum Co., Bartlesville, Okla.

Reexamination Request:
No. 90/001,868, Oct. 23, 1989

Reexamination Certificate for:
Patent No.: 4,680,224
Issued: Jul. 14, 1987
Appl. No.: 773,965
Filed: Sep. 9, 1985

Related U.S. Application Data

[63] Continuation of Ser. No. 584,418, Mar. 6, 1984, abandoned, which is a continuation-in-part of Ser. No. 483,013, Apr. 7, 1983, abandoned.

[51] Int. Cl.⁵ .............................................. D02G 3/00
[52] U.S. Cl. ................................ 428/294; 427/430.1; 428/364; 428/396; 428/408; 428/902

[58] Field of Search .............. 428/292, 294, 902, 284, 428/285, 286

[56] References Cited

U.S. PATENT DOCUMENTS

| | | | |
|---|---|---|---|
| 2,751,320 | 6/1956 | Jacobs et al. | 156/180 |
| 3,354,129 | 11/1967 | Edmonds et al. | 260/79 |
| 3,919,177 | 11/1975 | Campbell | 260/79.1 |
| 3,993,726 | 11/1976 | Moyer | 264/174 |
| 4,312,917 | 1/1982 | Hawley | 428/375 |
| 4,549,920 | 10/1985 | Cogswell et al. | 156/181 |
| 4,559,262 | 12/1985 | Cogswell et al. | 428/294 |
| 4,680,224 | 7/1987 | O'Connor | 428/294 |

Primary Examiner—George F. Lesmes
Attorney, Agent, or Firm—Richmond, Phillips, Hitchcock and Umphlett

[57] ABSTRACT

A process for preparing shaped objects of continuous fiber strand material in a poly(arylene sulfide) matrix and the shaped objects prepared thereby. The shaped objects are prepared by a pultrusion process requiring adaptation of polymer slurry contacting with fiber strands and specifically adapted die apparatus suitable for use with viscous poly(arylene sulfide).

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

11. Claims 1–14 are cancelled.

* * * * *